4/21/87    XR    4,658,868

United States Patent [19]

Word

[11] Patent Number: 4,658,868

[45] Date of Patent: Apr. 21, 1987

[54] ASPHALT PUMPING SYSTEM AND METHOD

[76] Inventor: Tim D. Word, 2314 Camelback, San Antonio, Tex. 78209

[21] Appl. No.: 275,878

[22] Filed: Jun. 22, 1981

[51] Int. Cl.⁴ .......................... B65B 3/04; F28D 1/06
[52] U.S. Cl. .................................... 141/11; 141/65;
    141/82; 141/279; 37/1; 37/195; 114/256;
    126/343.5 R; 137/340; 137/13; 165/132;
    220/217
[58] Field of Search ................. 137/13, 334, 340;
    165/132; 220/217, 219, 222; 114/256; 141/279,
    82, 387, 388, 389, 65, 1–12, 63, 66, 98;
    126/343.5 R, 271.2 A; 37/1, 19 S

[56] References Cited

U.S. PATENT DOCUMENTS 4,117,794  10/1978  Sjogren ..................... 126/343.5 R
4,230,138  10/1980  Tanaka ...................... 126/343.5 R Primary Examiner—Houston S. Bell, Jr.
Attorney, Agent, or Firm—Hubbard, Thurman, Turner & Tucker

[57]  ABSTRACT

A method and apparatus for recovering viscous fluid such as asphalt, which utilizes an elongated insulated buoyant housing with an elongated heating element disposed therein. The heating element extends through the elongated housing and out at an open end thereof to heat the viscous fluid. A pump located at a second end of the elongated housing is utilized to draw the heated viscous fluid through the housing. The insulated nature of the housing concentrates the output of the heating element into the fluid within the housing and prevents heat loss.

11 Claims, 6 Drawing Figures

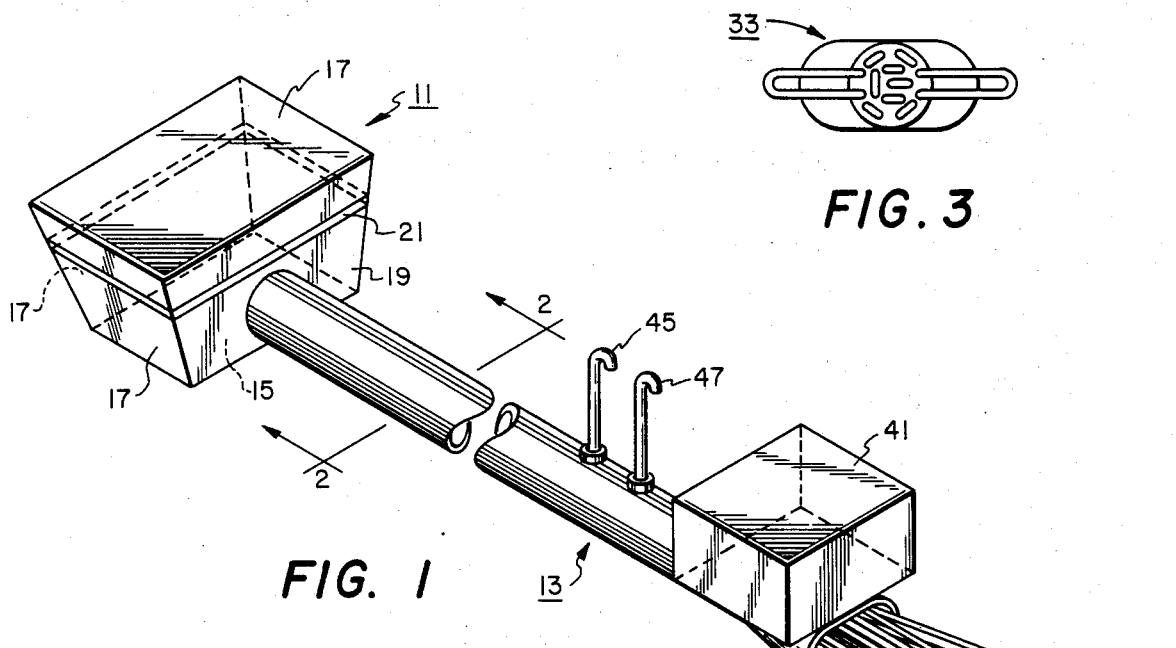
FIG. 3
FIG. 1
FIG. 2
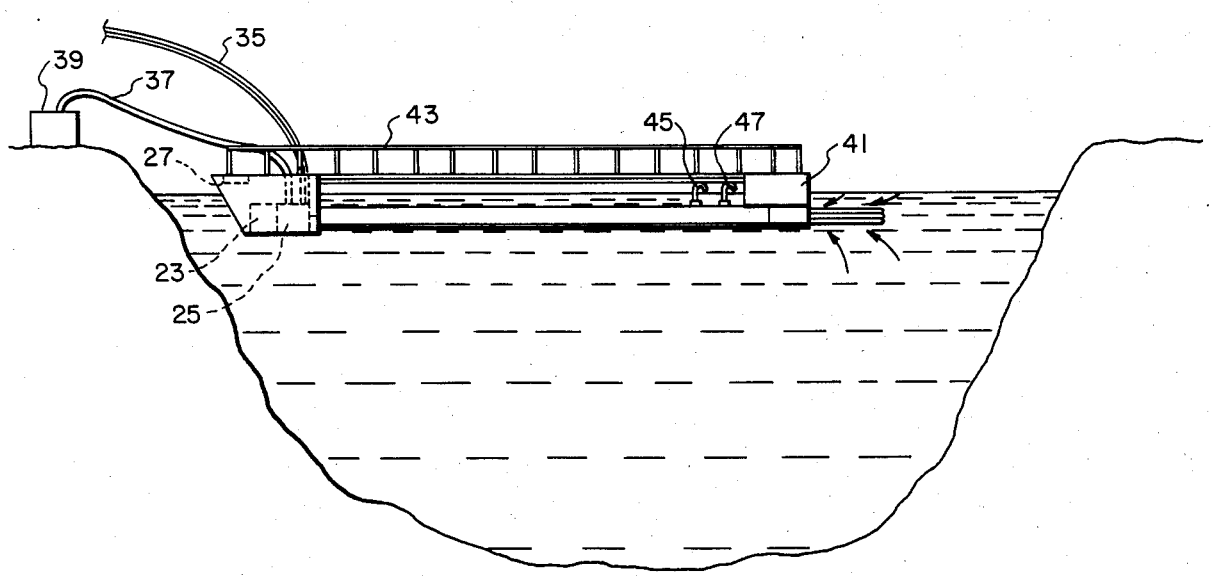
FIG. 4

ASPHALT PUMPING SYSTEM AND METHOD

The present invention relates to a system for recovering viscous material, such as asphalt, or heavy crude, from a store thereof in an economical and practical manner.

Asphalt is flowable and pumpable when hot, but is stiff and difficult to pump at temperatures below about 70 degrees fahrenheit and can be impossible to pump at some ambient temperatures. Since the price of asphalt can vary considerably, a contractor using a substantial quantity of that material will wish to achieve price stability by buying ahead of time and delivering the asphalt to the construction site. However, this raises problems in recovering the cooled asphalt from the store when needed, particularly when the temperature is 70 degrees fahrenheit or lower.

Previously used methods have employed large metal tanks in which the asphalt is stored. It has been the practice to heat the whole of the metal tank in order to give the asphalt therein sufficient flowability for pumping.

It has recently been proposed to bulldoze a large pit in the ground of the storage site and then pump the asphalt into that pit. It is an object of the present invention to provide a system for recovery of viscous material from such a pit.

It is a further object to provide such a system which consumes a minimum amount of energy in recovering the viscous material by using only such amount of heat as it necessary to achieve flowability of a pumpable amount of the material.

It is a further object to provide a system which draws material from a warmest area near the top surface thereof and heats only that material which is withdrawn and not all or a major portion of the stored material.

Accordingly, the present invention provides a floating housing or barge which is placed on the asphalt surface and from which extends a hollow, elongate member containing a heating element. The heating element extends through and beyond the free end of the elongate member to heat material in the vicinity of the open end of the member. The heated material flows into and through the hollow member to a pump located in the barge. The pump then delivers the asphalt to a temporary store on the ground surrounding the pit or directly to a truck or to a plant at which it is required.

Preferably the pump is a positive displacement pump disposed below the surface of the asphalt and equipped with a variable speed drive.

Advantageously, the hollow member comprises spaced-apart inner and outer members with a void between them. The void may be dead air space or may be filed with thermal insulating material. The void ensures that heat is supplied to the asphalt in the pond only by the portion of the heating element which projects beyond the elongate member and reduces the amount of heat lost to the surrounding viscous material as the stream of material flowing through the inner member to the pump is heated to maintain it in molten state. The void also provides buoyancy for the heating element, enabling it to float in the asphalt pond.

Further objects and advantages of the invention will be apparent from the following description of a preferred embodiment of the invention, which will now be described in conjunction with the accompanying drawings.

BRIEF DESCRIPTION OF THE DRAWINGS

FIG. 1 is a perspective view (with some parts omitted for clarity) of a device embodying the invention;

FIG. 2 is a cross-section on the line 2—2 in FIG. 1;

FIG. 3 is an end elevation of part of the device shown in FIG. 1;

FIG. 4 illustrates the device shown in FIGS. 1, 2 and 3 in use;

DETAILED DESCRIPTION OF THE PREFERRED EMBODIMENTS

Figure 5:
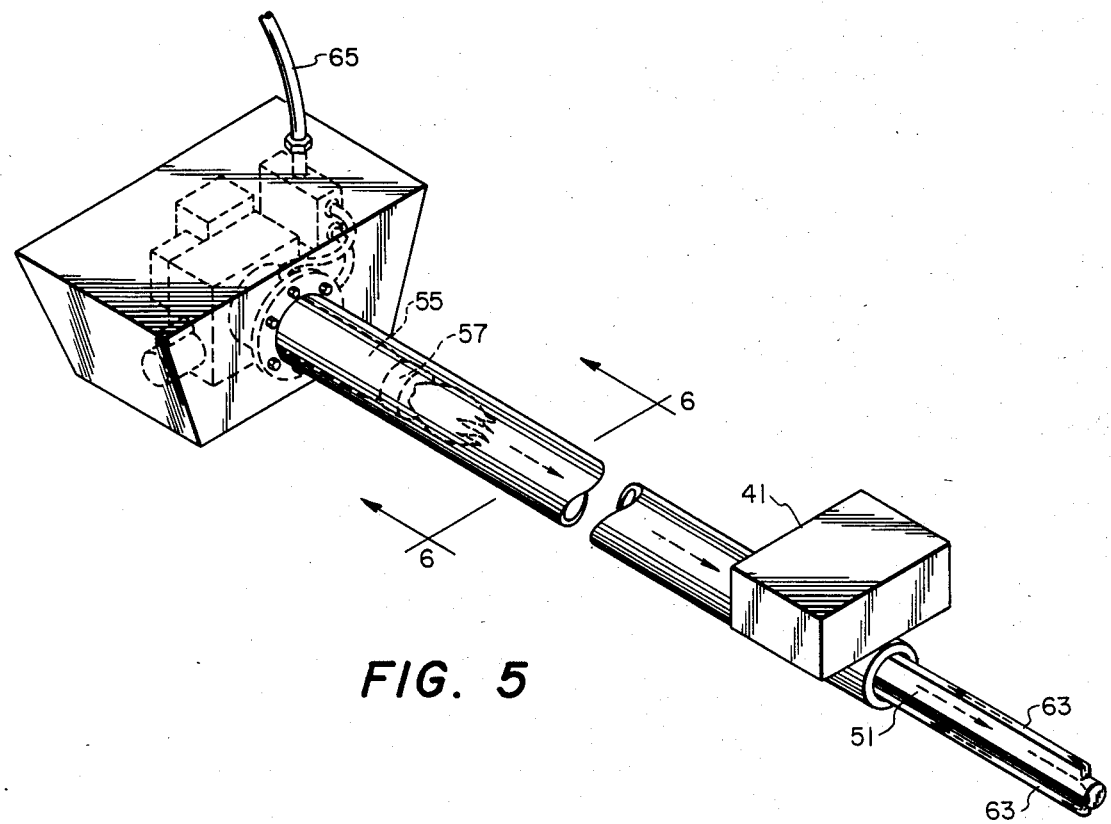
FIG. 5 is a perspective view of an alternate embodiment.

Referring firstly to FIGS. 1 through 4, a device for recovering asphalt from an open pond thereof comprises a floating housing or barge 11 from which extends an elongate heating element or heat exchanger 13. The barge 11 has a flat rectangular bottom 15, side walls 17, which extend upwardly and outwardly from the bottom 15 on three sides thereof, and a fourth side wall 19, which extends upwardly from the bottom 15 at right angles thereto. Exterior stiffening members 21 are provided to support the side walls and give mechanical strength to the barge 11.

The barge 11 has mounted within it a variable speed hydraulic motor 23 (FIG. 3), which drives a positive displacement pump 25 (FIG. 3). The pump 25 is disposed low down within the barge 11 so that it will be below the surface of the asphalt in the pond when the device is in use and provide a flooded suction. The motor 23 is powered by means of a hydrostatic power pack 27 (FIG. 3) carried by the barge 11.

The elongate heating element 13 extends from and is connected to the side wall 19 adjacent the bottom 15. It comprises two concentric cylindrical members, an inner member 29 and an outer member 31 of respective diameters 20 inches and 28 inches. The outer end of the inner cylindrical member 29 extends beyond the outer end of the outer member 31 and is flared outwardly, meeting the free end of member 13 and closing off the space between the two cylindrical members. This space is filled with thermally insulating material, such as foamed plastic 32.

Extending through the inner member 31 are heating coils 33 which extend from the barge 11 to a position beyond the outer end of the member 29. As best seen in FIG. 1, there are ten separate heating coils. At their inner ends, the heating coils 33 extend through the wall 19 and are connected to a flexible conduit 35 (FIG. 3), which extends from the barge 11 to the ground adjacent to the margins of the asphalt pond for supplying hot fluid, for example, hot oil or steam, to the coils 33 from a source provided on the ground.

The pump 25 is connected to the inner member 29 to provide suction thereto and a line 37 connects the output of the pump 25 to an asphalt receiver 39 on the ground.

Support for the outer end of the heating element 13 is provided by a float 41 connected to that outer end. In addition, a catwalk 43 extends along and vertically above the heating element 13 to provide access between the barge 11 and the outer end of the heating element 13. A vent pipe 45 connects the interior member 31 to a vent port disposed, in use, above the surface of the asphalt, to allow for escape of any steam caught within the interior of the member 31 and thus prevent air locking. A second vent 47 is provided for the space between the two cylindrical members 29 and 31 to allow escape of any gas trapped within the insulating material 32.

In use, the hot fluid passed through the coils 33 melts the asphalt in the area of the free end of the heating element 13, allowing suction applied by the pump 25 to suck that warmed asphalt through the member 29, and back to the barge 11. During its passage through the member 29, the asphalt is further heated up to a pumpable viscosity by contact with the coils 33. However, because of the insulation 32, the only area of the pond heated is that in the vicinity of the free end of the element 13.

The speed of operation of the pump 25 is controlled to match the rate of heating of the asphalt and maintain a balance between the amount of asphalt withdrawn and the amount heated.

Figure 6:
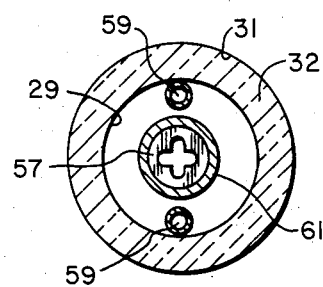
FIG. 6 is a cross-section on the line 6—6 in FIG. 5.

A further embodiment of the invention is shown in FIGS. 5 and 6. It is substantially similar to the embodiment described above except that the heating element 13 comprises not circulation coils for carrying heated fluid, but a direct fired heating device 51 connected at its inner end to a gas or gas/oil combination burner 53 which directs hot gases from a combustion chamber 57 through a clover-leaf baffle 57 into the primary heat transfer tube 51. The tube 51 comprises an outer surface 59 of heat conducting material and an inner lining 61 of refractory which is heated to irradiation by the hot gaseous products of combustion. At the outer end of the tube 51, secondary return tubes 63 are provided through which the hot gases flow back parallel to, but spaced from, the primary heat transfer tube to exit through a common exhaust 65. The use of a direct fired heater eliminates the requirement for a hot oil heater or a steam boiler.

In alternative forms of the invention, the pump 25 can be powered by an electric motor or an engine.

The members 29 and 31 may have a cross-sectional shape other than circular, for example, elliptical or rectangular.

The outer free end of the heating element 13 can be arranged to move vertically to different depths for selective removal and/or mixing of the stored viscous material.

I claim:

1. A device for recovering viscous material from a pond thereof comprising:
   an elongated buoyant housing including thermal insulation means for impeding the transfer of thermal energy between the interior and exterior thereof and having an open first end into which viscous material in which the housing is floating will pass;
   at least one elongate heating member disposed within said housing and extending to the proximity of said first end for heating the viscous material near the open first end to cause the material to become less viscous and flow into the housing;
   pump means having its suction inlet coupled to said housing for withdrawing heated material from a second end of said housing.

2. A device as claimed in claim 1, wherein said pump means is a positive displacement pump disposed, in use, below the surface of the viscous material in said pond.

3. A device as claimed in claim 1, wherein said thermal insulation means comprises foamed plastic material.

4. A device as claimed in claim 1, wherein said at least one elongate heating member comprises a hollow tube adapted to circulate a hot fluid.

5. A device according to claim 1, further including means for varying the pumping speed of said pumping means whereby the pumping rate and heating rate may be maintained in balance.

6. A device according to claim 1, wherein said buoyant housing includes inner and outer shells, said inner and outer shells forming a void therebetween for increasing the insulative and buoyant nature of said housing.

7. A device for recovering viscous material from a pond thereof comprising:
   an elongated buoyant thermally insulated housing;
   at least one elongate heating member disposed within said housing and extending through said housing at a first end thereof; and
   pump means having its suction inlet coupled to a second end of said housing for transferring said viscous material through said housing.

8. A device as claimed in claim 6, wherein said at least one elongate heating member comprises a hollow tube adapted to circulate a hot fluid.

9. A device according to claim 6 further including means for varying the pumping speed of said pumping means whereby the pumping rate and heating rate may be maintained in balance.

10. A method of storing and recovering a highly viscous fluid comprising:
    excavating a large pit in the earth;
    pumping a highly viscous fluid into said pit for storage;
    disposing an elongated buoyant insulated housing on the surface of said fluid;
    heating said fluid at a first end of said housing and within the interior of said housing; and
    applying suction to a second end of said housing whereby said heated highly viscous fluid is transferred through said housing.

11. A method of recovering a highly viscous fluid stored in a pit in the earth comprising:
    disposing an elongated buoyant insulated housing on the surface of said fluid;
    heating said fluid at a first end of said housing and within the interior of said housing; and
    applying suction to a second end of said housing whereby said heated highly viscous fluid is transferred through said housing.

* * * * *